US012663909B2

(12) United States Patent
Horikawa et al.

(10) Patent No.: US 12,663,909 B2
(45) Date of Patent: Jun. 23, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Masamoto Horikawa, Tokyo (JP);
Naomasa Takahashi, Chiba (JP);
Yoichi Hirota, Kanagawa (JP);
Yasunari Ikeda, Tokyo (JP)

(73) Assignee: SONY GROUP CORPORATION,
Tokyo (JP)

( * ) Notice: Subject to any disclaimer, the term of this patent is extended or adjusted under 35 U.S.C. 154(b) by 235 days.

(21) Appl. No.: 18/576,989

(22) PCT Filed: Feb. 22, 2022

(86) PCT No.: PCT/JP2022/007128
§ 371 (c)(1),
(2) Date: Jan. 5, 2024

(87) PCT Pub. No.: WO2023/286312
PCT Pub. Date: Jan. 19, 2023

(65) Prior Publication Data
US 2025/0083055 A1      Mar. 13, 2025

(30) Foreign Application Priority Data

Jul. 13, 2021      (JP) ................................. 2021-115724

(51) Int. Cl.
*A63F 13/79*      (2014.01)
*H04L 67/131*      (2022.01)

(52) U.S. Cl.
CPC ............ *A63F 13/79* (2014.09); *H04L 67/131* (2022.05)

(58) Field of Classification Search
None
See application file for complete search history.

(56) References Cited

U.S. PATENT DOCUMENTS 8,814,704 B2 *    8/2014   Togashi ................ A63F 13/332
                                                                  463/42
9,555,324 B1      1/2017   Harrington et al.

FOREIGN PATENT DOCUMENTS

| | | |
|---|---|---|
| JP | 2003-079954 A | 3/2003 |
| JP | 2017-040970 A | 2/2017 |
| JP | 2021-047720 A | 3/2021 |
| WO | WO-2009133531 A2 * | 11/2009 ............. A63F 13/12 |

* cited by examiner

*Primary Examiner* — Duane N Taylor, Jr.
(74) *Attorney, Agent, or Firm* — Paratus Law Group, PLLC

(57)                ABSTRACT

There is provided an information processing apparatus capable of improving convenience of a user who is allowed to sequentially log in to a plurality of virtual spaces. The information processing apparatus includes: an acquisition unit that acquires an evaluation result for a first user obtained by evaluating an action history of the first user in a first virtual space; and a service control unit that controls provision, to the first user, of a service according to the evaluation result for the first user, in a second virtual space different from the first virtual space.

20 Claims, 9 Drawing Sheets

FIG. 5

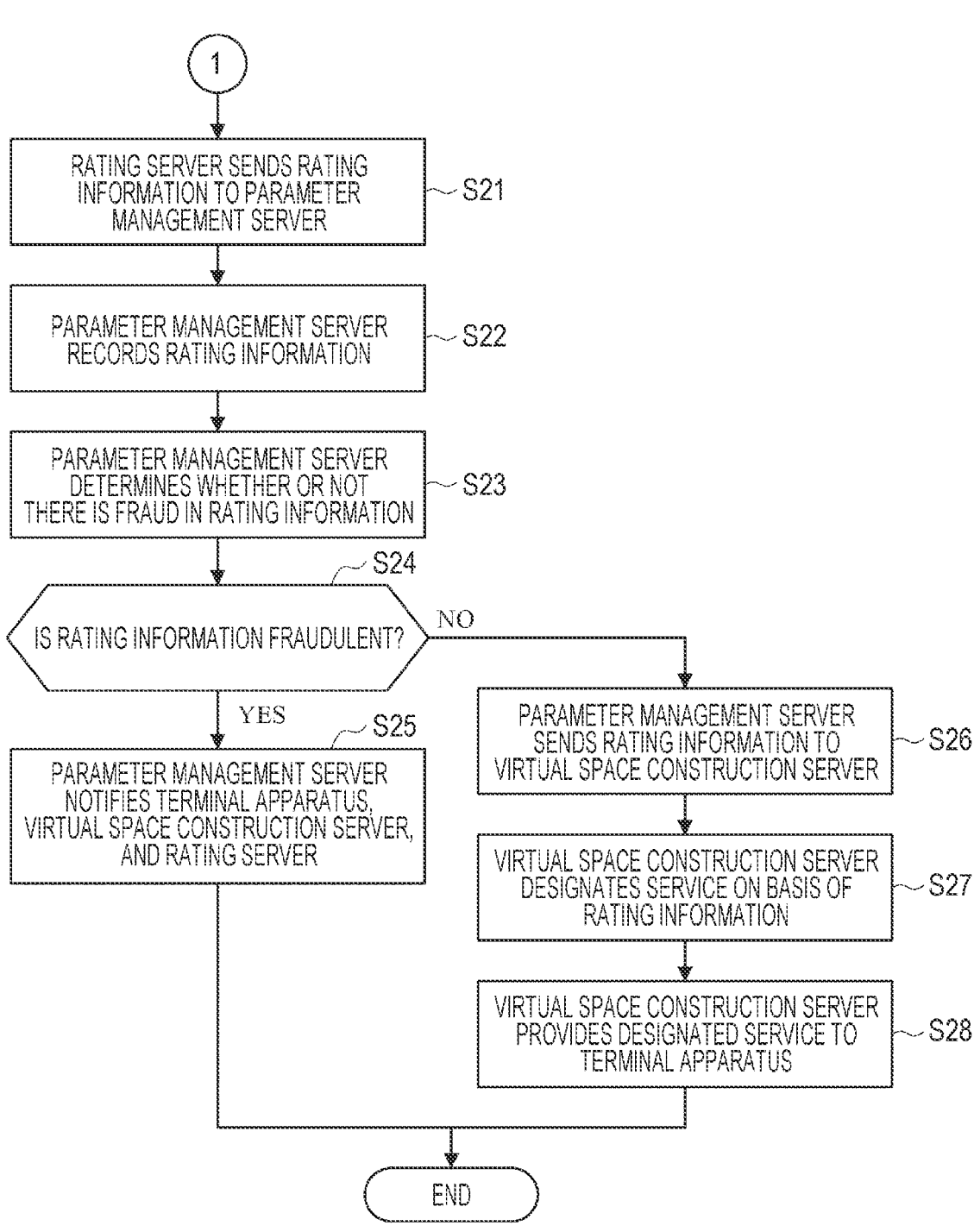

①

RATING SERVER SENDS RATING
INFORMATION TO PARAMETER
MANAGEMENT SERVER — S21

PARAMETER MANAGEMENT SERVER
RECORDS RATING INFORMATION — S22

PARAMETER MANAGEMENT SERVER
DETERMINES WHETHER OR NOT
THERE IS FRAUD IN RATING INFORMATION — S23

S24

IS RATING INFORMATION FRAUDULENT?        NO

YES        S25

PARAMETER MANAGEMENT SERVER
NOTIFIES TERMINAL APPARATUS,
VIRTUAL SPACE CONSTRUCTION SERVER,
AND RATING SERVER

PARAMETER MANAGEMENT SERVER
SENDS RATING INFORMATION TO
VIRTUAL SPACE CONSTRUCTION SERVER — S26

VIRTUAL SPACE CONSTRUCTION SERVER
DESIGNATES SERVICE ON BASIS OF
RATING INFORMATION — S27

VIRTUAL SPACE CONSTRUCTION SERVER
PROVIDES DESIGNATED SERVICE TO
TERMINAL APPARATUS — S28

END

FIG. 6

| DESIGN RATING | NUMBER OF COLORS ALLOWED TO BE USED | MAXIMUM NUMBER OF VERTICES OF MODEL ALLOWED TO BE USED | NUMBER OF MODELS ALLOWED TO BE HELD | TRADE OF CREATED VIRTUAL OBJECT |
|---|---|---|---|---|
| AAA | 256 | 10000000 | 3 | ALLOWED |
| AA | 128 | 1000000 | 2 | ALLOWED |
| A | 64 | 100000 | 1 | ALLOWED |
| BBB | 32 | 10000 | 1 | NOT ALLOWED |

FIG. 7

| WORD | CHANGE IN SCORE |
|---|---|
| "○○○" | −3 POINTS |
| "× × ×" | −3 POINTS |
| "△△△" | +0.1 POINTS |
| "~□□" | +0.1 POINTS |
| "~◇◇" | −0.5 POINTS |

*FIG. 8*

| GRADE RATING | PARTICIPATION IN VIRTUAL SPACE | AREAS ALLOWED TO ENTER | PARTICIPATION IN EVENT IN VIRTUAL SPACE | CONVERSATION WITH ANOTHER USER |
|---|---|---|---|---|
| AAA | PERMITTED | ALL AREAS | PARTICIPATION PERMITTED IN ANY SEAT | PERMITTED |
| AA | PERMITTED | COMMON PEOPLE AREA | PARTICIPATION PERMITTED IN COMMON PEOPLE SEAT | PERMITTED AMONG PEOPLE WITH SAME GRADE |
| A | PERMITTED | COMMON PEOPLE AREA | PARTICIPATION NOT PERMITTED | NOT PERMITTED |
| BBB | NOT PERMITTED | NONE | PARTICIPATION NOT PERMITTED | NOT PERMITTED |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/007128 (filed on Feb. 22, 2022) under 35 U.S.C. § 371, which claims priority to Japanese Patent Application No. 2021-115724 (filed on Jul. 13, 2021), which are all hereby incorporated by reference in their entirety.

TECHNICAL FIELD

The present disclosure relates to an information processing apparatus, an information processing method, and a program.

BACKGROUND ART

In recent years, services have attracted attention in which a large number of users log in to the same virtual space using their avatars. For example, a technology for constructing a virtual space to be logged in by a large number of users is known (see, for example, Patent Document 1). In addition, there is a plurality of such virtual spaces, and there is a case where one user is allowed to sequentially log in to the plurality of virtual spaces.

CITATION LIST

Patent Document

Patent Document 1: Japanese Patent Application Laid-Open No. 2021-47720

SUMMARY OF THE INVENTION

Problems to be Solved by the Invention

At this time, it is desirable to provide a technology capable of improving convenience of a user who is allowed to sequentially log in to a plurality of virtual spaces.

Solutions to Problems

According to a certain aspect of the present disclosure, there is provided an information processing apparatus including: an acquisition unit that acquires an evaluation result for a first user obtained by evaluating an action history of the first user in a first virtual space; and a service control unit that controls provision, to the first user, of a service according to the evaluation result for the first user, in a second virtual space different from the first virtual space.

In addition, according to another aspect of the present disclosure, there is provided an information processing method including: acquiring an evaluation result for a first user obtained by evaluating an action history of the first user in a first virtual space; and controlling, by a processor, provision, to the first user, of a service according to the evaluation result for the first user, in a second virtual space different from the first virtual space.

In addition, according to another aspect of the present disclosure, there is provided a program for causing a computer to function as an information processing apparatus including: an acquisition unit that acquires an evaluation result for a first user obtained by evaluating an action history of the first user in a first virtual space; and a service control unit that controls provision, to the first user, of a service according to the evaluation result for the first user, in a second virtual space different from the first virtual space.

BRIEF DESCRIPTION OF DRAWINGS

FIG. 5 is a flowchart illustrating a working example of the information processing system according to the embodiment of the present disclosure.

FIG. 6 is a diagram illustrating an example of correspondence between ratings of designs (design ratings) and action restrictions according to the design ratings.

FIG. 7 is a diagram illustrating an example of correspondence between low-grade words and high-grade words, and score changes.

FIG. 8 is a diagram illustrating an example of correspondence between ratings of grades (grade ratings) and action restrictions according to the grade ratings.

MODE FOR CARRYING OUT THE INVENTION

Figure 1:
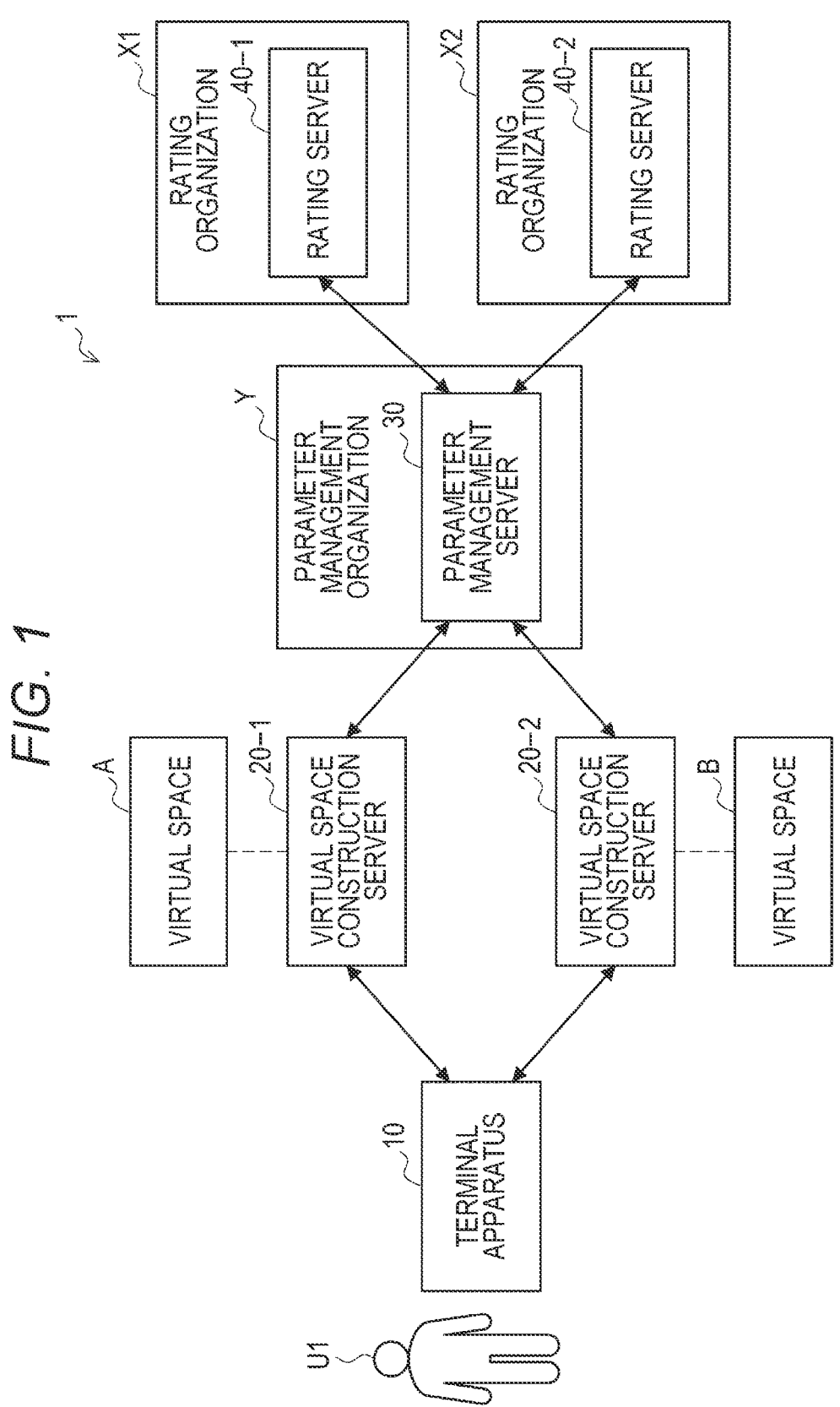
FIG. 1 is a diagram for explaining a configuration example of an information processing system according to an embodiment of the present disclosure.

A preferred embodiment of the present disclosure will be described below in detail with reference to the accompanying drawings. It should be noted that, in the present specification and the drawings, constituent elements having substantially the same functional configuration will be denoted by the same reference signs, and a redundant description will be omitted.

In addition, in the present specification and the drawings, a plurality of constituent elements having substantially the same or similar functional configurations will be sometimes distinguished by attaching different numbers after the same reference signs. However, in a case where it is not necessary to particularly distinguish each of a plurality of constituent elements having substantially the same or similar functional configurations, only the same reference signs will be given. Furthermore, similar constituent elements of different embodiments will be sometimes distinguished by attaching different alphabets after the same reference signs. However, in a case where it is not necessary to particularly distinguish each of the similar constituent elements, only the same reference signs will be given.

Note that the description will be given in the following order.

0. Outline
1. Details of Embodiments
1.1. System Configuration Example
1.2. Functional Details
1.3. Working Examples
2. Various Application Examples 3. Hardware Configuration Example
4. Conclusion

0. Outline

First, an outline of an embodiment of the present disclosure will be described. In recent years, services have attracted attention in which a large number of users log in to the same virtual space using their avatars. There is a plurality of such virtual spaces, and there is a case where one user is allowed to sequentially log in to the plurality of virtual spaces.

Here, in each of the plurality of virtual spaces, there are parameters (such as ability, experience value, status, fame, and reputation as an example) that define the social nature of the user. These parameters defining the social nature (hereinafter also simply referred to as "parameters") exist individually for each virtual space and are altered according to the action of the user (such as a skill level and remarkable activity or progress level as an example) in the virtual space. Then, the virtual space controls the service to be provided to the user, according to the parameters.

As an example, the parameter "level of the user" is a parameter reflecting the skill level or progress level of the user, and as this parameter rises, the number of services available to the user, such as facilities, in the virtual space grows larger.

How to change these parameters, and values, effects, criteria, or the like of the parameters are designated individually for each virtual space by a group or an individual who has produced the virtual space. Therefore, it is usually unacceptable to bring a parameter reflecting the action of the user in a certain virtual space A into another virtual space B. Thus, the user gets an evaluation in the virtual space B separately from the evaluation got in the virtual space A and gets provision of a service in the virtual space B on the basis of the evaluation got in the virtual space B.

Therefore, even if the user is excellent in a certain ability (such as design ability or leadership as an example) and has got an evaluation according to this ability and a service according to the got evaluation in the virtual space A, once the user logs in to the virtual space B different from the virtual space A, a parameter is generated anew in the virtual space B. Accordingly, an evaluation and a service equivalent to the evaluation and service got in the virtual space A will be no longer allowed to be got in the virtual space B. In this manner, at present, one user is treated completely independently in each of a plurality of virtual spaces.

In addition, it is not easy to unify the evaluations got by the user between a plurality of virtual spaces. Then, even if the evaluations got by the user can be unified, the degree of freedom in designating parameters in the virtual space lowers. Therefore, currently, there is no mechanism that allows users to get equivalent services between a plurality of virtual spaces.

In addition, usually, since the virtual space is a closed world, it is not assumed that the user moves between a plurality of virtual spaces. Furthermore, the movement of users between a plurality of virtual spaces does not bring about any advantage to the production side of the virtual spaces.

Thus, in the embodiment of the present disclosure, a technology capable of improving convenience of a user who is allowed to sequentially log in to a plurality of virtual spaces will be mainly proposed. Hereinafter, such a technology will be described in detail.

The outline of the embodiment of the present disclosure has been described above.

1. Details of Embodiments

Next, the embodiment of the present disclosure will be described in detail.

(1.1. System Configuration Example)

First, a configuration example of an information processing system according to the embodiment of the present disclosure will be described.

FIG. 1 is a diagram for explaining a configuration example of the information processing system according to the embodiment of the present disclosure. As illustrated in FIG. 1, an information processing system 1 according to the embodiment of the present disclosure includes a terminal apparatus 10, virtual space construction servers 20-1 and 20-2, a parameter management server 30, and rating servers 40-1 and 40-2.

In the following description, the virtual space construction servers 20-1 and 20-2 will be sometimes called virtual space construction servers 20 without being particularly distinguished. The number of the virtual space construction servers 20 is not limited to two, and any plural number of the virtual space construction servers 20 is only required. In addition, the rating servers 40-1 and 40-2 will be sometimes called rating servers 40 without being particularly distinguished. The number of the rating servers 40 is also not limited to two, and one or any plural number of the rating servers 40 is only required.

(Terminal Apparatus 10)

As illustrated in FIG. 1, the terminal apparatus 10 is used by a user U1 (first user). In the embodiment of the present disclosure, a case where the terminal apparatus 10 is a game machine is mainly assumed. However, the form of the terminal apparatus 10 is not limited to the game machine.

For example, the terminal apparatus 10 may be an augmented reality (AR) device (such as AR glasses as an example) worn on the body of the user U1. Alternatively, the terminal apparatus 10 may be a wearable device (such as a virtual reality (VR) device as an example) other than the AR device. Alternatively, the terminal apparatus 10 may be an apparatus other than the wearable device (such as a smartphone, a smart watch, or a personal computer (PC) as an example).

The terminal apparatus 10 can access a virtual space A constructed by the virtual space construction server 20-1 via a network (not illustrated) on the basis of a login operation by the user U1 specifying the virtual space construction server 20-1. In the virtual space A, an avatar corresponding to the user U1 exists, and the user U1 can operate the avatar by an input to the terminal apparatus 10. The avatar corresponding to the user U1 in the virtual space A can correspond to an example of a virtual object existing in the virtual space A.

Similarly, the terminal apparatus 10 can access a virtual space B constructed by the virtual space construction server 20-2 via a network (not illustrated) on the basis of a login operation by the user U1 specifying the virtual space construction server 20-2. In the virtual space B, an avatar corresponding to the user U1 exists, and the user U1 can operate the avatar by an input to the terminal apparatus 10. The avatar corresponding to the user U1 in the virtual space B can correspond to an example of a virtual object existing in the virtual space B.

Figure 2:
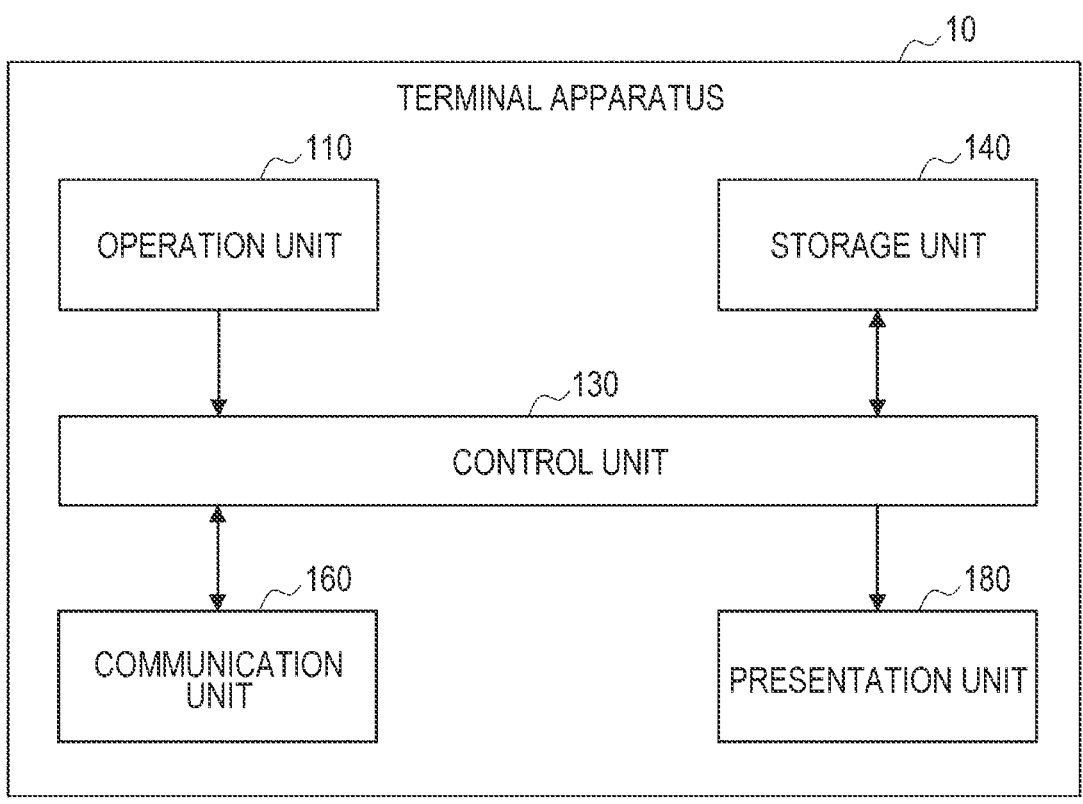
FIG. 2 is a diagram illustrating a functional configuration example of a terminal apparatus.

FIG. 2 is a diagram illustrating a functional configuration example of the terminal apparatus 10. As illustrated in FIG.

2, the terminal apparatus 10 includes an operation unit 110, a control unit 130, a storage unit 140, a communication unit 160, and a presentation unit 180.

(Operation Unit 110)

The operation unit 110 has a function of accepting an operation input by the user U1. Here, a case where the operation unit 110 is formed with a controller (such as a game controller) is mainly assumed. However, the operation unit 110 is not limited to the controller. For example, the operation unit 110 may be formed with an input device such as a mouse, a keyboard, a touch panel, or a microphone. The operation accepted by the operation unit 110 is sent to the virtual space construction server 20-1 or 20-2 specified by the user U1.

The controller not only includes a button but also includes a sensor that detects a motion of the user U1. The detection result for the motion of the user U1 is continuously sent to the virtual space construction server 20-1 or 20-2 that constructs the virtual space to which the user U1 is being logged in. In the embodiment of the present disclosure, a case where the acceleration of a predetermined part of the body (such as an arm or a hand as an example) of the user U1 is detected by an acceleration sensor as an example of the motion of the user U1 is mainly assumed. However, the sensor may detect a motion other than acceleration. For example, the angular velocity of a predetermined part of the body of the user U1 may be detected by a gyro sensor as an example of the motion of the user U1.

(Control Unit 130)

For example, the control unit 130 may be formed with one or a plurality of central processing units (CPUs) or the like. In a case where the control unit 130 is formed with a processing apparatus such as a CPU, the processing apparatus may be formed with an electronic circuit. The control unit 130 can be implemented by the processing apparatus executing a program.

(Storage Unit 140)

The storage unit 140 is a recording medium that has a configuration including a memory and, for example, stores a program to be executed by the control unit 130 and the data necessary for executing this program. In addition, the storage unit 140 temporarily stores data for computation by the control unit 130. The storage unit 140 is formed with a magnetic storage unit device, a semiconductor storage device, an optical storage device, a magneto-optical storage device, or the like.

(Communication Unit 160)

The communication unit 160 is formed with a communication interface. For example, the communication unit 160 communicates with the virtual space construction server 20-1 via a network (not illustrated), or communicates with the virtual space construction server 20-2 via a network (not illustrated).

(Presentation Unit 180)

The presentation unit 180 presents various kinds of information to the user U1, under the control of the control unit 130. For example, the presentation unit 180 can include a display. At this time, the display may be a transmissive display capable of visually recognizing a real-world image, an optical see-through display, or a video see-through display. Alternatively, the display may be a non-transmissive display that presents a virtual world image having a three-dimensional structure corresponding to the real world, instead of the real world image.

The transmissive display is mainly used for augmented reality (AR), and the non-transmissive display is mainly used for virtual reality (VR). Furthermore, the presentation unit 180 can also include an X reality (XR) display used for both of the AR and VR purposes. For example, the presentation unit 180 performs AR display or VR display of the virtual object, or UI display of text or the like.

Note that the presentation of various kinds of information by the presentation unit 180 may be performed by voice presentation by a speaker, may be performed by haptic presentation by a haptic presentation apparatus, or may be performed by another presentation device.

Returning to FIG. 1, the description of the configuration example of the information processing system 1 will be continued.

(Virtual Space A)

The virtual space A is constructed by the virtual space construction server 20-1. Not only the user U1 is allowed to log in to the virtual space A, but also users other than the user U1 are allowed to log in to the virtual space A. That is, a large number of users can log in to the virtual space A using their avatars. In a case where the user U1 is being logged in to the virtual space A, the virtual space A is provided to the terminal apparatus 10 from the virtual space construction server 20-1, and the virtual space A is presented to the user U1 by the presentation unit 180 of the terminal apparatus 10.

(Virtual Space B)

Similarly, the virtual space B is constructed by the virtual space construction server 20-2. Not only the user U1 is allowed to log in to the virtual space B, but also users other than the user U1 are allowed to log in to the virtual space B. That is, a large number of users can log in to the virtual space B using their avatars. In a case where the user U1 is being logged in to the virtual space B, the virtual space B is provided to the terminal apparatus 10 from the virtual space construction server 20-2, and the virtual space B is presented to the user U1 by the presentation unit 180 of the terminal apparatus 10.

Note that, in the embodiment of the present disclosure, two virtual spaces A and B will be given as an example of the virtual spaces to which the user U1 is allowed to log in and described. However, the number of virtual spaces to which the user U1 is allowed to log in is not limited to two. For example, the number of virtual spaces to which the user U1 is allowed to log in may be three or more. In the following description, the user U1 and users other than user U1 will be sometimes referred to as "users" without being particularly distinguished.

As illustrated in FIG. 1, the parameter management server 30 is a server that manages an action history of the user in the virtual spaces A and B and is managed by a parameter management organization Y. The rating server 40-1 is a server that evaluates the action histories of the user in the virtual spaces A and B to obtain evaluation results and is managed by a rating organization X1. Similarly, the rating server 40-2 is a server that evaluates the action histories of the user in the virtual spaces A and B to obtain evaluation results and is managed by a rating organization X2.

Note that the action history of the user can include an operation history of the user (such as button input as an example), a virtual object created by the user, a history of statement information on the user (such as a chat history as an example), evaluations from other users (such as evaluations from other users on creation of a virtual object, as an example), and the like.

In the following description, evaluating the action history will also be referred to as "rating", and an evaluation result obtained by evaluating the action history will also be referred to as "rating information". Hereinafter, a functional configuration example of each of the virtual space construction server 20, the parameter management server 30, and the rating server 40 will be described with reference to FIG. 3.

(Virtual Space Construction Server 20)

The virtual space construction server 20 can be implemented by a computer. The virtual space construction server 20 is connected to a network (not illustrated) using a communication interface (not illustrated) and is capable of communicating with each of the terminal apparatus 10 and the parameter management server 30 via the network (not illustrated) using the communication interface (not illustrated).

The virtual space construction server 20 includes a storage unit (not illustrated). The storage unit (not illustrated) is a recording medium that has a configuration including a memory and, for example, stores a program to be executed by a control unit (not illustrated) and the data necessary for executing this program. In addition, the storage unit (not illustrated) temporarily stores data for computation by the control unit (not illustrated). The storage unit (not illustrated) is formed with a magnetic storage unit device, a semiconductor storage device, an optical storage device, a magneto-optical storage device, or the like.

The virtual space construction server 20 further includes the control unit (not illustrated). For example, the control unit (not illustrated) may be formed with one or a plurality of CPUs or the like. In a case where the control unit (not illustrated) is formed with a processing apparatus such as a CPU, the processing apparatus may be formed with an electronic circuit. The control unit (not illustrated) can be implemented by the processing apparatus executing a program. The control unit (not illustrated) includes an acquisition unit 210, a service control unit 220, and a service providing unit 230. Specific functions of these blocks will be described in detail later.

(Parameter Management Server 30)

The parameter management server 30 can be implemented by a computer. The parameter management server 30 is connected to a network (not illustrated) using a communication interface (not illustrated) and is capable of communicating with each of the terminal apparatus 10, the virtual space construction server 20, and the rating server 40 via the network (not illustrated) using the communication interface (not illustrated).

The parameter management server 30 includes a storage unit (not illustrated). The storage unit (not illustrated) is a recording medium that has a configuration including a memory and, for example, stores a program to be executed by a control unit (not illustrated) and the data necessary for executing this program. In addition, the storage unit (not illustrated) temporarily stores data for computation by the control unit (not illustrated). The storage unit (not illustrated) is formed with a magnetic storage unit device, a semiconductor storage device, an optical storage device, a magneto-optical storage device, or the like. The storage unit (not illustrated) includes a recording unit 320. A specific function of the recording unit 320 will be described in detail later.

The parameter management server 30 further includes the control unit (not illustrated). For example, the control unit (not illustrated) may be formed with one or a plurality of CPUs or the like. In a case where the control unit (not illustrated) is formed with a processing apparatus such as a CPU, the processing apparatus may be formed with an electronic circuit. The control unit (not illustrated) can be implemented by the processing apparatus executing a program. The control unit (not illustrated) includes an action history fraud identifying unit 310 and a rating fraud identifying unit 330. Specific functions of these blocks will be described in detail later.

(Rating Server 40)

The rating server 40 can be implemented by a computer. The rating server 40 is connected to a network (not illustrated) using a communication interface (not illustrated) and is capable of communicating with the parameter management server 30 via the network (not illustrated) using the communication interface (not illustrated).

The rating server 40 includes a storage unit (not illustrated). The storage unit (not illustrated) is a recording medium that has a configuration including a memory and, for example, stores a program to be executed by a control unit (not illustrated) and the data necessary for executing this program. In addition, the storage unit (not illustrated) temporarily stores data for computation by the control unit (not illustrated). The storage unit (not illustrated) is formed with a magnetic storage unit device, a semiconductor storage device, an optical storage device, a magneto-optical storage device, or the like.

The rating server 40 further includes the control unit (not illustrated). For example, the control unit (not illustrated) may be formed with one or a plurality of CPUs or the like. In a case where the control unit (not illustrated) is formed with a processing apparatus such as a CPU, the processing apparatus may be formed with an electronic circuit. The control unit (not illustrated) can be implemented by the processing apparatus executing a program. The control unit (not illustrated) includes a rating unit 410. A specific function of the rating unit 410 will be described in detail later.

The configuration example of the information processing system 1 according to the embodiment of the present disclosure has been described above.

(1.2. Functional Details)

Next, functional details of the information processing system 1 according to the embodiment of the present disclosure will be described with reference to FIG. 3.

Figure 3:
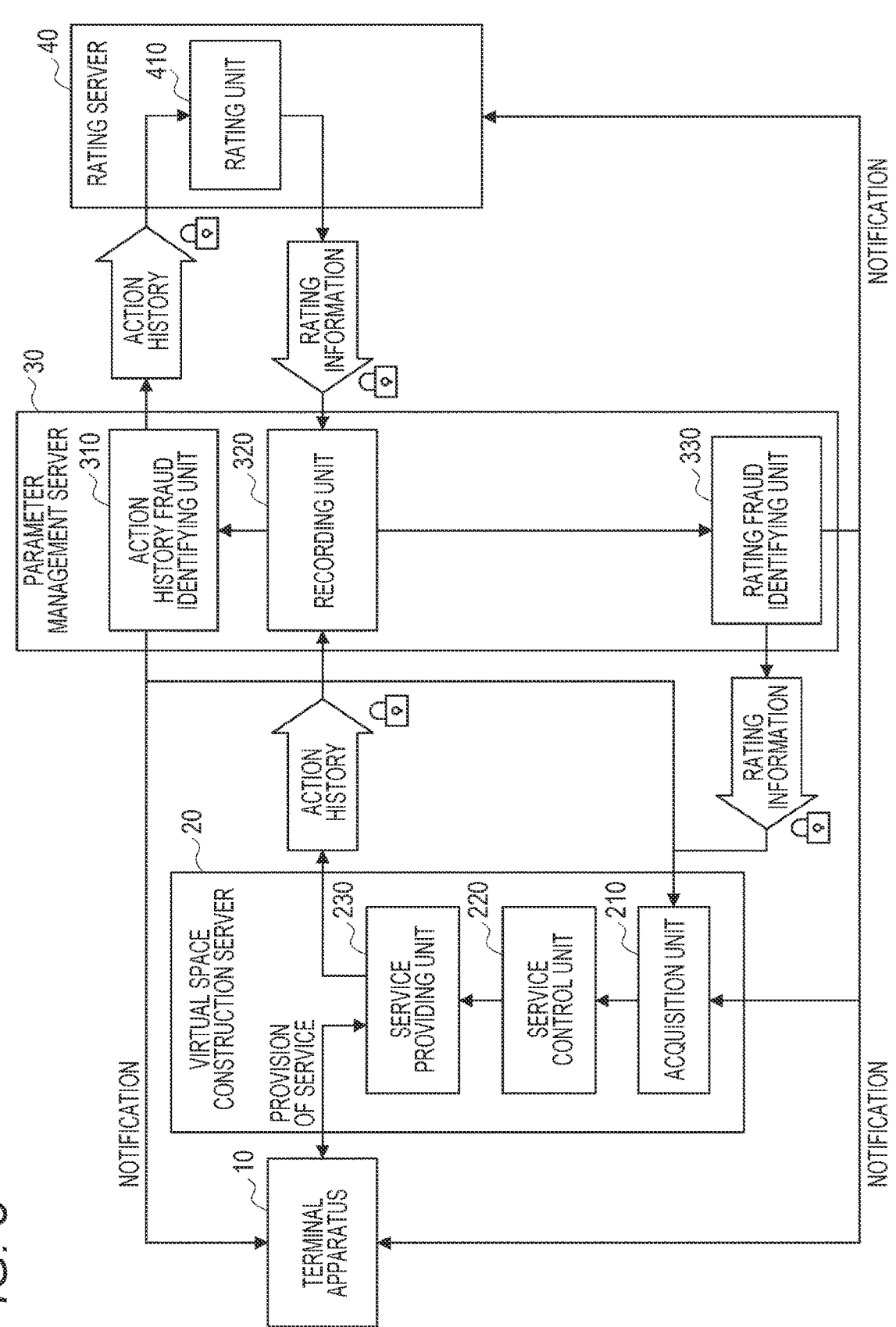
FIG. 3 is a diagram illustrating a functional configuration example of the information processing system according to the embodiment of the present disclosure.

FIG. 3 is a diagram illustrating a functional configuration example of the information processing system 1 according to the embodiment of the present disclosure. As described above, the terminal apparatus 10 accesses the virtual space A constructed by the virtual space construction server 20-1 via a network (not illustrated) on the basis of a login operation by the user U1 specifying the virtual space construction server 20-1. The service providing unit 230 in the virtual space construction server 20-1 provides a service to the terminal apparatus 10 corresponding to the user U1 in the virtual space A to which the user U1 is being logged in.

When an operation for permitting to send the action history to the rating server 40 is input from the user U1 to the operation unit 110 in the terminal apparatus 10, the service providing unit 230 in the virtual space construction server 20-1 sends the action history of the user U1 in the virtual space A to which the user U1 is being logged in, to the parameter management server 30. Note that the action history may be regularly provided to the parameter management server 30 from the virtual space construction server 20-1, or may be provided at a predetermined timing (such as when the user U1 logs out of the virtual space A, as an example).

As also illustrated in FIG. 3, to send the "action history" from the virtual space construction server 20-1 to the parameter management server 30, it is desirable to perform data protection with the guarantee of the communication source and encryption, by encrypted communication using a certificate (such as hypertext transfer protocol secure (https)

encrypted communication, as an example). This prevents the "action history" from being read and falsified by a malicious third party and communication with a communication source faked from being performed.

In addition, the fairness and reliability of the system are maintained by the data protection with the guarantee of the communication source and encryption by the parameter management server 30. Therefore, the parameter management organization Y can obtain a reward from the rating organization, a group or an individual that produces a virtual space, a user, and the like for data protection with the guarantee of the communication source and encryption.

In the parameter management server 30, the recording unit 320 records the action history received from the virtual space construction server 20-1. Next, a case where the user U1 logs out of the virtual space A and logs in to the virtual space B is assumed. The terminal apparatus 10 accesses the virtual space B constructed by the virtual space construction server 20-2 via a network (not illustrated) on the basis of a login operation by the user U1 specifying the virtual space construction server 20-2.

In the parameter management server 30, the action history fraud identifying unit 310 determines whether or not there is fraud in the action history of the user U1 recorded in the recording unit 320 on the basis of the reception of the action history. This can prevent a malicious group or individual who produces a virtual space from providing a fraudulent action history.

Note that, as a scene in which a fraudulent action history is provided, a case where, for example, a group or an individual who produces a virtual space and has illicitly given or taken money or goods with the user U1 or the like fabricates and provides the action history is assumed.

In addition, the function of identifying fraud in the action history by the parameter management server 30 maintains the fairness and reliability of the system. Therefore, the parameter management organization Y can obtain a reward from a rating organization, a group or an individual that produces a virtual space, a user, and the like for providing the function of identifying fraud in the action history.

At this time, the action history of the user U1 to be determined as to whether or not there is fraud is not limited to the action while the user U1 is logging in to the virtual space A and may be the entire action history of the user U1 recorded in the recording unit 320.

Here, whether or not there is fraud in the action history of the user U1 may be determined in any way. For example, the action history fraud identifying unit 310 may determine whether or not there is fraud in the action history of the user U1 on the basis of an index of unnaturalness of the new action history of the user U1 with respect to the action history of the same user until then (that is, the degree of separation of the new action history of the user U1 from the action history of the same user until then).

In more detail, in a case where the action history of the user U1 is newly input, the action history fraud identifying unit 310 may calculate the index of unnaturalness of the input new action history with respect to the action history of the same user until then and determine whether or not there is fraud in the action history of the user U1 on the basis of whether or not the index of unnaturalness is higher than a threshold value. For example, the action history fraud identifying unit 310 may determine that there is fraud in the action history of the user U1 in a case where the index of unnaturalness is higher than the threshold value. On the other hand, the action history fraud identifying unit 310 may determine that there is no fraud in the action history of the user U1 in a case where the index of unnaturalness is equal to or lower than the threshold value.

In a case where the action history fraud identifying unit 310 determines that there is fraud in the action history of the user U1, the action history fraud identifying unit 310 notifies each of the terminal apparatus 10 and the virtual space construction server 20-2 constructing the virtual space B to which the user U1 is being logged in that there is fraud in the action history of the user U1. This ensures that the action history fraud identifying unit 310 controls the virtual space construction server 20-2 so as not to execute the provision of a service according to the rating information on the user U1 to the user U1.

At this time, in the virtual space construction server 20-2, the service control unit 220 restricts or stops the provision of the service to the user U1 on the basis of the fact that the service control unit 220 has been controlled by the action history fraud identifying unit 310 so as not to execute the provision of a service according to the rating information on the user U1 to the user U1.

On the other hand, in a case where the action history fraud identifying unit 310 determines that there is no fraud in the action history of the user U1, the action history fraud identifying unit 310 sends the action history of the user U1 to the rating server 40.

As also illustrated in FIG. 3, to provide the "action history" to the rating server 40 from the parameter management server 30, it is desirable to perform data protection with the guarantee of the communication source and encryption, by encrypted communication using a certificate. This prevents the "action history" from being read and falsified by a malicious third party and communication with a communication source faked from being performed.

In the rating server 40, the rating unit 410 rates the user U1 and designates the rating information on the user U1 on the basis of the action history of the user U1 received from the action history fraud identifying unit 310. Note that a specific example of the rating by the rating unit 410 will be described in detail later. The rating unit 410 sends the rating information on the user U1 to the parameter management server 30. The rating organizations X1 and X2 can obtain a reward for providing the rating information.

As also illustrated in FIG. 3, to provide the "rating information" to the parameter management server 30 from the rating server 40, it is desirable to perform data protection with the guarantee of the communication source and encryption, by encrypted communication using a certificate. This prevents the "rating information" from being read and falsified by a malicious third party and communication with a communication source faked from being performed.

In the parameter management server 30, the recording unit 320 records the rating information on the user U1 received from the rating server 40. Then, the rating fraud identifying unit 330 determines whether or not there is fraud in the rating information on the user U1. This can prevent the malicious rating organization X1 or X2 from providing fraudulent rating information.

Note that, as a scene in which fraudulent rating information is provided, a case where, for example, the rating organization X1 or X2 who has illicitly given or taken money or goods with the user U1 or the like fabricates and provides the rating information is assumed.

In addition, the function of identifying fraud in the rating information by the parameter management server 30 maintains the fairness and reliability of the system. Therefore, the parameter management organization Y can obtain a reward from a rating organization, a group or an individual that produces a virtual space, a user, and the like for providing the function of identifying fraud in the rating information.

Here, whether or not there is fraud in the rating information on the user U1 may be determined in any way. For example, the rating fraud identifying unit 330 may detect a user (second user) whose action history has similarity to the action history of the user U1 higher than predetermined similarity (first similarity), as a comparison partner, and determine whether or not there is fraud in the rating information on the user U1 on the basis of a difference between the rating information on the user U1 and the rating information on the comparison partner. In more detail, the rating fraud identifying unit 330 may determine whether or not there is fraud in the rating information on the user U1 on the basis of whether or not the difference between the rating information on the user U1 and the rating information on the comparison partner is higher than a threshold value. For example, in a case where the difference is higher than the threshold value, the rating fraud identifying unit 330 may determine that there is fraud in the rating information on the user U1. On the other hand, in a case where the difference is equal to or lower than the threshold value, the rating fraud identifying unit 330 may determine that there is no fraud in the rating information on the user U1.

Alternatively, the rating fraud identifying unit 330 may detect a user (third user) whose rating information has similarity to the rating information on the user U1 higher than predetermined similarity (second similarity), as a comparison partner, and determine whether or not there is fraud in the rating information on the user U1 on the basis of a difference between the rating information on the user U1 and the rating information on the comparison partner. In more detail, the rating fraud identifying unit 330 may determine whether or not there is fraud in the rating information on the user U1 on the basis of whether or not the difference between the rating information on the user U1 and the rating information on the comparison partner is higher than a threshold value. For example, in a case where the difference is higher than the threshold value, the rating fraud identifying unit 330 may determine that there is fraud in the rating information on the user U1. On the other hand, in a case where the difference is equal to or lower than the threshold value, the rating fraud identifying unit 330 may determine that there is no fraud in the rating information on the user U1.

In a case where the rating fraud identifying unit 330 determines that there is fraud in the rating information on the user U1, the rating fraud identifying unit 330 notifies each of the terminal apparatus 10, the virtual space construction server 20-2 constructing the virtual space B to which the user U1 is being logged in, and the rating server 40 that there is fraud in the rating information on the user U1. This ensures that the rating fraud identifying unit 330 controls the virtual space construction server 20-2 so as not to execute the provision of a service according to the rating information on the user U1 to the user U1.

At this time, in the virtual space construction server 20-2, the service control unit 220 restricts or stops the provision of the service to the user U1 on the basis of the fact that the service control unit 220 has been controlled by the rating fraud identifying unit 330 so as not to execute the provision of a service according to the rating information on the user U1 to the user U1.

On the other hand, in a case where the rating fraud identifying unit 330 determines that there is no fraud in the rating information on the user U1, the rating fraud identifying unit 330 sends the rating information on the user U1 to the virtual space construction server 20-2 constructing the virtual space B to which the user U1 is being logged in.

As also illustrated in FIG. 3, to provide the "rating information" to the virtual space construction server 20-2 from the parameter management server 30, it is desirable to perform data protection with the guarantee of the communication source and encryption, by encrypted communication using a certificate. This prevents the "rating information" from being read and falsified by a malicious third party and communication with a communication source faked from being performed.

In the virtual space construction server 20-2, the acquisition unit 210 acquires the rating information on the user U1 received from the parameter management server 30. Then, the service control unit 220 controls the service providing unit 230 such that a service according to the rating information on the user U1 acquired by the acquisition unit 210 is provided to the user U1 in the virtual space B. This ensures that a service according to the rating information on the user U1 is provided to the user U1, and it is thus expected that the quality of the service provided to the user U1 is enhanced.

In more detail, in the virtual space construction server 20-2, the service control unit 220 notifies the service providing unit 230 of a service according to the rating information on the user U1, the user U1, and the virtual space B. The service providing unit 230 provides the service notified by the service control unit 220 to the terminal apparatus 10 corresponding to the user U1 in the virtual space B.

As an example, the service control unit 220 may control the provision of the service by increasing the restriction imposed on the action of the user U1 in the virtual space B as the rating corresponding to the user U1 is lower. An example of correspondence between ratings and action restrictions will be described in detail later.

Note that, in the above, a case where the action history fraud identifying unit 310 determines whether or not there is fraud in the action history and a case where the rating unit 410 determines whether or not there is fraud in the rating information have been mainly assumed. However, both of the determination by the action history fraud identifying unit 310 and the determination by the rating unit 410 do not necessarily have to be performed. For example, only one of the determination by the action history fraud identifying unit 310 and the determination by the rating unit 410 may be performed.

The functional details of the information processing system 1 according to the embodiment of the present disclosure have been described above.

(1.3. Working Examples)

Next, a working example of the information processing system 1 according to the embodiment of the present disclosure will be described with reference to FIGS. 4 and 5.

Figure 4:
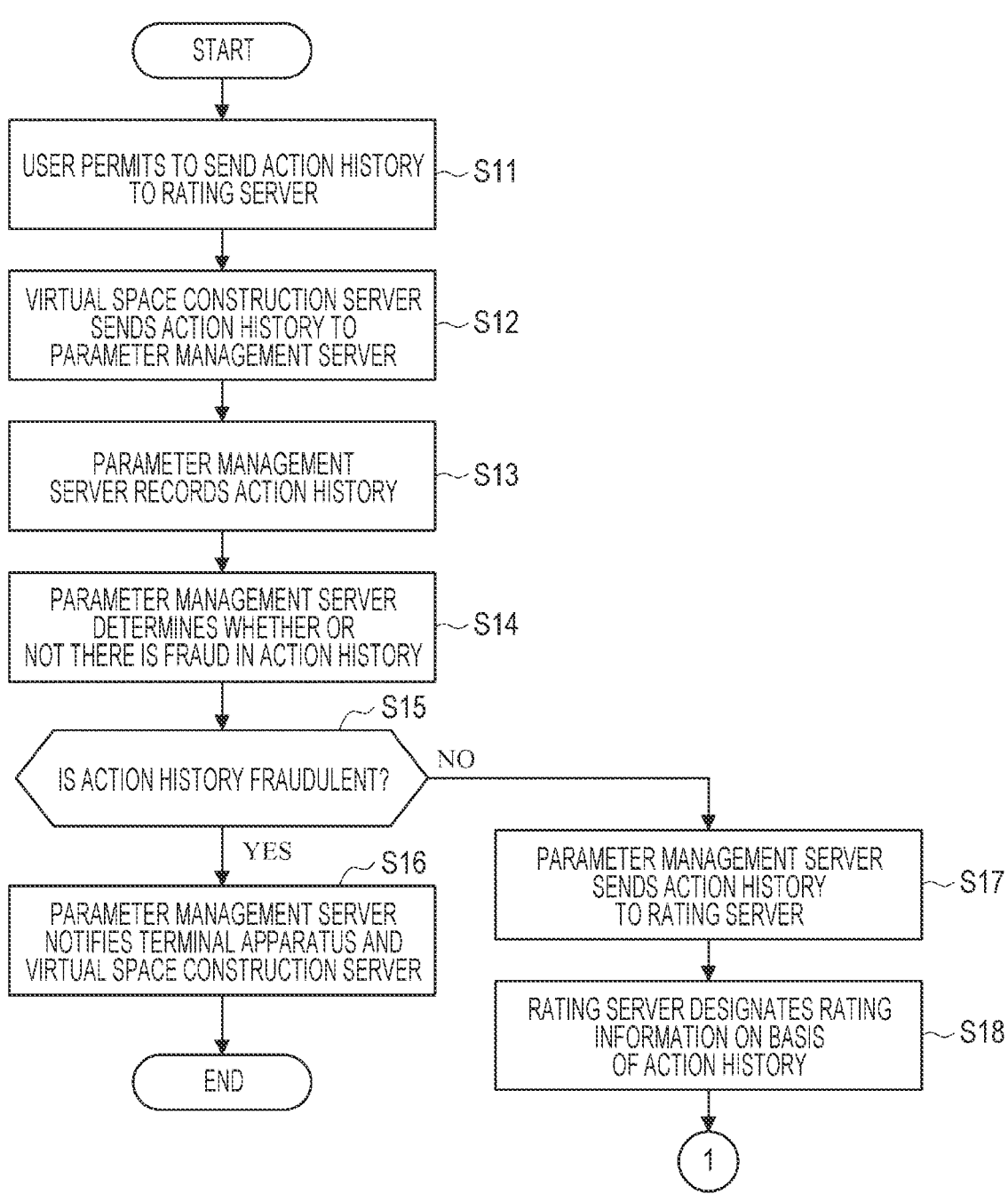
FIG. 4 is a flowchart illustrating a working example of the information processing system according to the embodiment of the present disclosure.

FIGS. 4 and 5 are flowcharts illustrating a working example of the information processing system 1 according to the embodiment of the present disclosure. As illustrated in FIG. 4, when an operation for permitting to send the action history to the rating server 40 is input from the user U1 to the operation unit 110 in the terminal apparatus 10 (S11), the service providing unit 230 in the virtual space construction server 20-1 sends the action history of the user U1 in the virtual space A to which the user U1 is being logged in, to the parameter management server 30 (S12).

In the parameter management server 30, the recording unit 320 records the action history received from the virtual space construction server 20-1 (S13). Next, a case where the user U1 logs out of the virtual space A and logs in to the virtual space B is assumed. The terminal apparatus 10 accesses the virtual space B constructed by the virtual space construction server 20-2 via a network (not illustrated) on the basis of a login operation by the user U1 specifying the virtual space construction server 20-2.

In the parameter management server 30, the action history fraud identifying unit 310 determines whether or not there is fraud in the action history of the user U1 recorded in the recording unit 320 on the basis of the reception of the action history (S14).

In a case where the action history fraud identifying unit 310 determines that there is fraud in the action history of the user U1 ("YES" in S15), the action history fraud identifying unit 310 notifies each of the terminal apparatus 10 and the virtual space construction server 20-2 constructing the virtual space B to which the user U1 is being logged in that there is fraud in the action history of the user U1 (S16). On the other hand, in a case where the action history fraud identifying unit 310 determines that there is no fraud in the action history of the user U1 ("NO" in S15), the action history fraud identifying unit 310 sends the action history of the user U1 to the rating server 40 (S17).

In the rating server 40, the rating unit 410 rates the user U1 and designates the rating information on the user U1 on the basis of the action history of the user U1 received from the action history fraud identifying unit 310 (S18). Then, as illustrated in FIG. 5, in the rating server 40, the rating unit 410 sends the rating information on the user U1 to the parameter management server 30 (S21).

In the parameter management server 30, the recording unit 320 records the rating information on the user U1 received from the rating server 40 (S22). The rating fraud identifying unit 330 determines whether or not there is fraud in the rating information on the user U1 (S23).

In a case where the rating fraud identifying unit 330 determines that there is fraud in the rating information on the user U1 ("YES" in S24), the rating fraud identifying unit 330 notifies each of the terminal apparatus 10, the virtual space construction server 20-2 constructing the virtual space B to which the user U1 is being logged in, and the rating server 40 that there is fraud in the rating information on the user U1 (S25). On the other hand, in a case where the rating fraud identifying unit 330 determines that there is no fraud in the rating information on the user U1 ("NO" in S24), the rating fraud identifying unit 330 sends the rating information on the user U1 to the virtual space construction server 20-2 constructing the virtual space B to which the user U1 is being logged in (S26).

In the virtual space construction server 20-2, the acquisition unit 210 acquires the rating information on the user U1 received from the parameter management server 30. Then, the service control unit 220 designates a service on the basis of the rating information on the user U1 acquired by the acquisition unit 210 (S27). The service control unit 220 controls the service providing unit 230 such that the designated service is provided to the user U1 in the virtual space B. In more detail, in the virtual space construction server 20-2, the service control unit 220 notifies the service providing unit 230 of the designated service, the user U1, and the virtual space B. The service providing unit 230 provides the service notified by the service control unit 220 to the terminal apparatus 10 corresponding to the user U1 in the virtual space B (S28).

The working example of the information processing system 1 according to the embodiment of the present disclosure has been described above.

2. Various Application Examples

Hereinafter, various application examples that can be assumed will be described. As examples of correspondence between ratings and action restrictions, a variety of examples can be assumed. In the following description, as examples of correspondence between ratings and action restrictions, an example of correspondence between ratings and action restrictions from the viewpoint of design ability will be described, and an example of correspondence between ratings and action restrictions from the viewpoint of formality will be described.

(Viewpoint of Design Ability)

In virtual spaces in recent years, the user U1 is allowed to create (hereinafter also referred to as "design") a virtual object. As an example of the virtual object created by the user U1, an avatar corresponding to the user U1, an avatar clothing, a logo mark, a building, or the like can be assumed. There are finite resources that can be used for such designs.

Here, as examples of the resources, the number of colors allowed to be used for design, the resolution of texture allowed to be used for design, the maximum number of vertices allowed to be used for a three-dimensional (3D) model as an example of the virtual object, the number of models allowed to be held, trade of the created virtual object, and the like can be assumed. A virtual space in which resources allocated to users are controlled for each user such that a service suitable for a user is provided to the user is assumed. For example, it is conceivable to allocate more resources to a user having a higher design ability.

For example, a case is assumed in which the user U1 acts in the virtual space A, gets a high evaluation on the basis of the action, and gets a high-quality service on the basis of the high evaluation. Then, a case where the user logs in to the virtual space B is assumed.

However, usually, the evaluation got by the user U1 in the virtual space A is an evaluation especial to the virtual space A. Accordingly, in the virtual space B, usually, the user U1 is not allowed to get an evaluation equivalent to the evaluation got in the virtual space A. Therefore, although the user U1 has an excellent design ability, the user U1 is only allowed to get a service equivalent to a service got by a normal user in the virtual space B, and in order to get a high evaluation in the virtual space B and raise the quality of the service, the user U1 has to continue the activity in the virtual space B and get an evaluation anew.

Thus, it is considered to introduce the rating mechanism according to the embodiment of the present disclosure. That is, the action history of the user U1 in the virtual space A may include design performed by the user U1 in the virtual space A. Then, in the rating server 40, the rating unit 410 may obtain the rating information on the user U1 by evaluating the action history of the user U1 in the virtual space A on the basis of the evaluation for the design of the user U1 in the virtual space A from another user (that is, one or a plurality of users different from the user U1).

For example, in a case where another user is allowed to assign a positive evaluation such as "like" or "favorite" to the design performed by the user U1 in the virtual space A, the rating unit 410 may designate the sum of the number of positive evaluations made by other users as the rating information. At this time, the rating unit 410 may equally treat every positive evaluation, or may calculate the sum of the number of positive evaluations by assigning a higher weight to the positive evaluation from a user having a higher design ability (such as a user having a high design rating as an example). Alternatively, in a case where the rating organization employs a famous artist or the like, an evaluation result by the famous artist may be used as the rating information.

For example, the higher the evaluation for the design of the user U1 in the virtual space A from other users, the higher the rating unit 410 may evaluate the action history of the user U1 in the virtual space A. Then, the rating unit 410 may provide the rating information on the user U1 to the virtual space construction server 20-2 constructing the virtual space B. In the virtual space construction server 20-2, the service control unit 220 controls the service providing unit 230 such that a service according to the rating information on the user U1 is provided to the user U1 in the virtual space B.

This allows the user U1 to get a service based on the evaluation for the design in the virtual space A, in the virtual space B without designing to get an evaluation anew in the virtual space B.

FIG. 6 is a diagram illustrating an example of correspondence between ratings of designs (design ratings) and action restrictions according to the design ratings. The service control unit 220 may increase the restriction imposed on the action of the user U1 by reducing the resources allocated to the action of the user U1 in the virtual space B. In the example illustrated in FIG. 6, the lower the design rating, the fewer the resources (the number of colors allowed to be used for design, the maximum number of vertices allowed to be used for a 3D model, the number of models allowed to be held, trade of the created virtual object, and the like) and the more the restriction imposed on the action increases.

(Viewpoint of Formality)

In order to express, in the virtual space A, a luxurious feeling similar to a luxurious feeling offered by a luxurious restaurant having a dress code in the real world, it is supposed that there is a request that the user to log in to the virtual space B is limited to a person with some grade. Alternatively, it is supposed that there is a request for excluding a user having a problematic conduct from logging in to the virtual space B, such as a significantly aggressive user or a user with bad language, in order to maintain the quiet virtual space B.

In terms of such requests, it is usually infeasible to evaluate a user before the user actually logs in to the virtual space. Therefore, it is usually difficult to satisfy such requests.

Thus, it is considered to introduce the rating mechanism according to the embodiment of the present disclosure. That is, the action history of the user U1 in the virtual space A may include a history of the statement information on the user U1 (such as a chat history as an example). Then, in the rating server 40, the rating unit 410 may obtain the rating information on the user U1 by evaluating the action history of the user U1 in the virtual space A on the basis of the frequency of predetermined words included in the statement information on the user U1 in the virtual space A.

For example, the lower the frequency of a first word (hereinafter also referred to as a "low-grade word") included in the statement information on the user U1, the higher the rating unit 410 may evaluate the action history of the user U1. Alternatively, the higher the frequency of a second word (hereinafter also referred to as a "high-grade word") included in the statement information on the user U1, the higher the rating unit 410 may evaluate the action history of the user U1. Note that the low-grade word and high-grade word can be extracted from the statement information on the user U1 by natural language processing or the like.

In more detail, the rating unit 410 may evaluate the action history of the user U1 by the sum of a score change corresponding to the low-grade word and a score change corresponding to the high-grade word included in the statement information on the user U1 to obtain the rating information on the user U1.

FIG. 7 is a diagram illustrating an example of correspondence between low-grade words and high-grade words, and score changes. A negative score change is associated with each of low-grade words "ooo", "xxx", and "~◇◇". For example, a positive score change is associated with each word of high-grade words "ΔΔΔ" and "~□□".

Note that the word can include a phrase that is a set of two or more words, as well as one word representing a certain meaning as a whole.

The correspondence between the low-grade words and the high-grade words and the score changes as illustrated in FIG. 7 can be automatically constructed by the rating unit 410.

For example, the low-grade words tend to be frequently used in a state in which other users (such as an unspecified large number of unacquainted users as an example) make statements to a certain user in an amount exceeding a predetermined amount per unit time (for example, in a case of a so-called "state under fire" in which a rush of criticism or censure is made). Accordingly, the rating unit 410 may extract a word included in the statements mentioned above as a low-grade word (such as a word included more than a certain threshold value, as an example) using natural language processing or the like on the basis of the detection of such a state.

Then, the rating unit 410 may provide the rating information on the user U1 to the virtual space construction server 20-2 constructing the virtual space B. In the virtual space construction server 20-2, the service control unit 220 controls the service providing unit 230 such that a service according to the rating information on the user U1 is provided to the user U1 in the virtual space B.

This allows the user U1 to get a service based on the evaluation for the action in the virtual space A, in the virtual space B without acting to get an evaluation anew in the virtual space B.

FIG. 8 is a diagram illustrating an example of correspondence between ratings of grades (grade ratings) and action restrictions according to the grade ratings. The service control unit 220 may increase the restriction imposed on the action of the user U1 by decreasing the range in which user U1 is allowed to act in the virtual space B.

In the example illustrated in FIG. 8, the lower the grade rating, the narrower the action range (participation in the virtual space, areas allowed to enter, participation in an event in the virtual space, conversation with another user, and the like) and the more the restriction imposed on the action increases. In particular, with the lowest grade rating "BBB", various actions by the user U1 are prohibited.

Note that the action history of the user U1 may include information regarding the handling of the controller by the user U1. Then, the rating unit 410 may evaluate the action history of the user U1 on the basis of the information regarding the handling of the controller by the user U1. As an example, the rating unit 410 may extract a behavior of continuously hitting a button of the controller, as a predetermined behavior (hereinafter also referred to as a "low-grade behavior") on the basis of information regarding the button pressing on the controller.

Alternatively, the rating unit 410 may extract a behavior of steeply tilting a stick of the controller, a behavior of swinging the controller around, a behavior of throwing the controller, or the like, as a low-grade behavior, on the basis of sensor data (such as acceleration or angular velocity as an example) of the controller and evaluate the action history of the user U1 lower as the frequency of the low-grade behavior is higher. For example, the sensor data may be acceleration, angular velocity, or the like. At this time, these behaviors may be extracted by detection of acceleration or angular velocity larger than a predetermined value, or the like.

Various application examples that can be assumed have been described above.

3. Hardware Configuration Example

Figure 9:
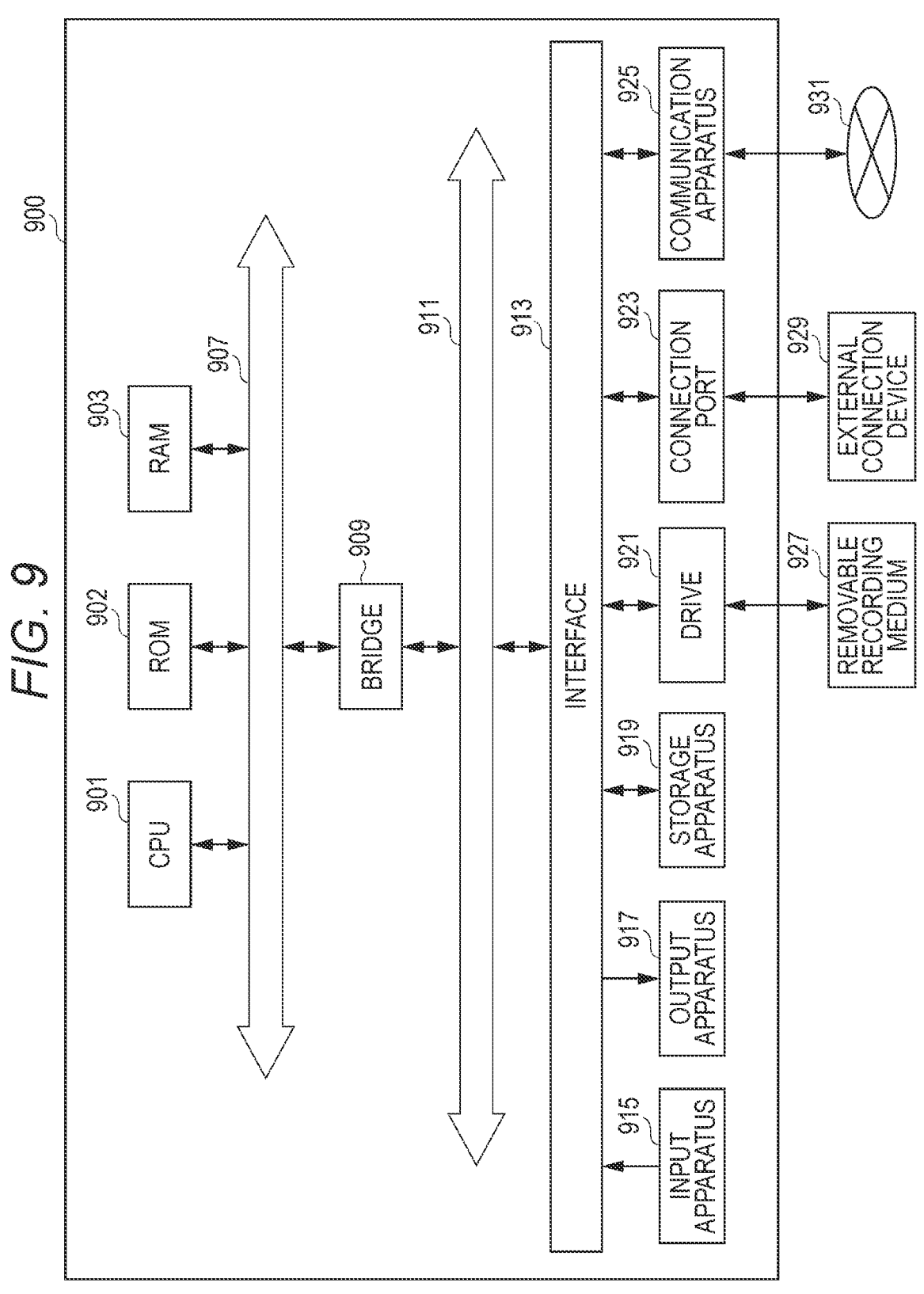
FIG. 9 is a block diagram illustrating a hardware configuration example of an information processing apparatus as an example of a virtual space construction server according to the embodiment of the present disclosure.

Next, a hardware configuration example of an information processing apparatus 900 as an example of the virtual space construction server 20 according to the embodiment of the present disclosure will be described with reference to FIG. 9. FIG. 9 is a block diagram illustrating a hardware configuration example of the information processing apparatus 900. Note that the virtual space construction server 20 does not necessarily have to include the whole hardware configuration illustrated in FIG. 9, and a part of the hardware configuration illustrated in FIG. 9 may not exist in the virtual space construction server 20. Note that hardware configurations of the parameter management server 30 and the rating server 40 can be similarly implemented.

As illustrated in FIG. 9, the information processing apparatus 900 includes a central processing unit (CPU) 901, a read only memory (ROM) 903, and a random access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. The information processing apparatus 900 may have a processing circuit called a digital signal processor (DSP) or an application specific integrated circuit (ASIC) instead of or in combination with the CPU 901.

The CPU 901 functions as a computational processing apparatus and a control apparatus and controls overall working in the information processing apparatus 900 or a part thereof, in accordance with various programs recorded in the ROM 903, the RAM 905, the storage apparatus 919, or a removable recording medium 927. The ROM 903 stores programs, computation parameters, and the like used by the CPU 901. The RAM 905 temporarily stores a program used in execution by the CPU 901, parameters that change as appropriate during the execution, and the like. The CPU 901, ROM 903, and RAM 905 are connected to each other by the host bus 907 formed with an internal bus such as a CPU bus. Furthermore, the host bus 907 is connected to the external bus 911 such as a peripheral component interconnect/interface (PCI) bus via the bridge 909.

The input apparatus 915 is, for example, an apparatus operated by the user, such as a button. The input apparatus 915 may include a mouse, a keyboard, a touch panel, switches, levers, and the like. The input apparatus 915 may also include a microphone that detects voice of the user. The input apparatus 915 may be, for example, a remote-control apparatus utilizing infrared light or other radio waves, or may be an external connection device 929 such as a mobile phone supporting operation of the information processing apparatus 900. The input apparatus 915 includes an input control circuit that generates and outputs an input signal to the CPU 901 on the basis of information input by the user. By operating this input apparatus 915, the user, for example, inputs various kinds of data to the information processing apparatus 900 or instructs the information processing apparatus 900 on processing working. In addition, an imaging apparatus 933 to be described later can function as an input apparatus by imaging a motion of a hand of the user, a finger of the user, or the like. At this time, a pointing position may be designated according to the motion of the hand and the direction of the finger.

The output apparatus 917 is formed with an apparatus capable of visually or audibly notifying the user of acquired information. For example, the output apparatus 917 can be a display apparatus such as a liquid crystal display (LCD) or an organic electro-luminescence (EL) display, a sound output apparatus such as a speaker and headphones, or the like. In addition, the output apparatus 917 may include a plasma display panel (PDP), a projector, a hologram, and a printer apparatus, and the like. The output apparatus 917 outputs a result obtained by processing of the information processing apparatus 900, for example, as a text or a video such as an image or outputs the result as sound such as a voice or acoustics. In addition, the output apparatus 917 may include a light or the like in order to brighten the surroundings.

The storage apparatus 919 is an apparatus for use in storing data configured as an example of a storage unit of the information processing apparatus 900. For example, the storage apparatus 919 is formed with a magnetic storage device such as a hard disk drive (HDD), a semiconductor storage device, an optical storage device, a magneto-optical storage device, or the like. This storage apparatus 919 stores programs and various kinds of data executed by the CPU 901, various kinds of data acquired from the outside, and the like.

The drive 921 is a reader/writer for the removable recording medium 927 such as a magnetic disk, an optical disc, a magneto-optical disk, or a semiconductor memory and is built in or externally attached to the information processing apparatus 900. The drive 921 reads information recorded in the mounted removable recording medium 927 and outputs the read information to the RAM 905. In addition, the drive 921 writes records in the mounted removable recording medium 927.

The connection port 923 is a port for directly connecting a device to the information processing apparatus 900. For example, the connection port 923 can be a universal serial bus (USB) port, an IEEE 1394 port, a small computer system interface (SCSI) port, or the like. In addition, the connection port 923 may be a recommended standard (RS)-232C port, an optical audio terminal, a high-definition multimedia interface (HDMI (registered trademark)) port, or the like. By connecting the external connection device 929 to the connection port 923, various kinds of data can be exchanged between the information processing apparatus 900 and the external connection device 929.

The communication apparatus 925 is, for example, a communication interface formed with a communication device or the like for connecting to a network 931. For example, the communication apparatus 925 can be a communication card for a wired or wireless local area network (LAN), Bluetooth (registered trademark), wireless USB (WUSB), or the like. In addition, the communication apparatus 925 may be a router for optical communication, a router for asymmetric digital subscriber line (ADSL), a modem for various kinds of communication, or the like. The communication apparatus 925 sends and receives signals and the like to and from, for example, the Internet and other communication devices, using a predetermined protocol such as transmission control protocol/Internet protocol (TCP/IP). In addition, the network 931 connected to the communication apparatus 925 is a network connected by wire or wirelessly and, for example, is the Internet, a home LAN, infrared communication, radio wave communication, satellite communication, or the like.

4. Conclusion

According to an embodiment of the present disclosure, there is provided an information processing apparatus including: an acquisition unit that acquires an evaluation result for a first user obtained by evaluating an action history of the first user in a first virtual space; and a service control unit that controls provision, to the first user, of a service according to the evaluation result for the first user, in a second virtual space different from the first virtual space. According to such a configuration, convenience of a user who is allowed to sequentially log in to a plurality of virtual spaces can be improved.

The preferred embodiments of the present disclosure have been described above in detail with reference to the accompanying drawings, but the technical scope of the present disclosure is not limited to such examples. It is obvious that those with ordinary skill in the technical field of the present disclosure may conceive various alterations or modifications within the scope of the technical idea recited in the claims, and it is naturally understood that these alterations or modifications also fall within the technical scope of the present disclosure.

In addition, the effects herein described are merely exemplary or illustrative, and not restrictive. In other words, the technology according to the present disclosure may have other effects that are obvious to those skilled in the art from the description of the present specification, together with or instead of the above-mentioned effects.

Note that the following configurations also fall within the technical scope of the present disclosure.

(1)

An information processing apparatus including:

an acquisition unit that acquires an evaluation result for a first user obtained by evaluating an action history of the first user in a first virtual space; and a service control unit that controls provision, to the first user, of a service according to the evaluation result for the first user, in a second virtual space different from the first virtual space.

(2)

The information processing apparatus according to (1) above, in which the service control unit controls the provision of the service by increasing a restriction imposed on an action of the first user in the second virtual space as the evaluation result for the first user is lower.

(3)

The information processing apparatus according to (2) above, in which the service control unit increases the restriction imposed on the action of the first user by reducing resources allocated to the action of the first user in the second virtual space.

(4)

The information processing apparatus according to (2) above, in which the service control unit increases the restriction imposed on the action of the first user by decreasing a range in which the first user is allowed to act in the second virtual space.

(5)

The information processing apparatus according to any one of (1) to (4) above, in which the service control unit restricts or stops the provision of the service to the first user on the basis of a fact that the service control unit has been controlled not to execute the provision, to the first user, of the service according to the evaluation result for the first user.

(6)

The information processing apparatus according to any one of (1) to (5) above, in which the action history of the first user includes creation of a virtual object by the first user, and is evaluated on the basis of evaluation for the creation of the virtual object from one or a plurality of users different from the first user.

(7)

The information processing apparatus according to (6) above, in which the action history of the first user is evaluated higher as the evaluation from the one or the plurality of users different from the first user is higher.

(8)

The information processing apparatus according to any one of (1) to (5) above, in which the action history of the first user includes statement information on the first user, and is evaluated on the basis of a frequency of a first word included in the statement information on the first user.

(9)

The information processing apparatus according to (8) above, in which the action history of the first user is evaluated higher as the frequency of the first word included in the statement information on the first user is lower.

(10)

The information processing apparatus according to (9) above, in which a word included in statements made for a certain user by other users are extracted as the first word on the basis of a fact that the statements have been detected in an amount exceeding a predetermined amount per unit time.

(11)

The information processing apparatus according to any one of (1) to (5) above, in which the action history of the first user includes information regarding handling of a controller by the first user, and the action history of the first user is evaluated on the basis of the information regarding the handling of the controller by the first user.

(12)

The information processing apparatus according to any one of (1) to (11) above, in which whether or not to provide the service according to the evaluation result for the first user to the first user in the second virtual space is controlled on the basis of a determination result obtained by determining whether or not there is fraud in at least any one of the action history of the first user in the first virtual space or the evaluation result for the first user obtained by evaluating the action history of the first user.

(13)

The information processing apparatus according to (12) above, in which whether or not there is fraud in the evaluation result for the first user is determined.

(14)

The information processing apparatus according to (13) above, in which whether or not there is fraud in the evaluation result for the first user is determined on the basis of a difference between the evaluation result for the first user and the evaluation result for a second user whose action history has similarity to the action history of the first user higher than first similarity, or a difference between the action history of the first user and the action history of a third user whose evaluation result has similarity to the evaluation result for the first user higher than second similarity.

(15)

The information processing apparatus according to (14) above, in which whether or not there is fraud in the evaluation result for the first user is determined on the basis of whether or not the difference between the evaluation result for the first user and the evaluation result for the second user or the difference between the action history of the first user and the action history of the third user is larger than a threshold value.

(16)

The determination apparatus according to (12) above, in which whether or not there is fraud in the action history of the first user is determined.

(17)

The information processing apparatus according to (16) above, in which whether or not there is fraud in the action history of the first user is determined on the basis of an index of unnaturalness of the action history newly added for the first user with respect to the action history of the first user until then.

(18)

The information processing apparatus according to (17) above, in which whether or not there is fraud in the action history of the first user is determined on the basis of whether or not the index of unnaturalness is larger than a threshold value.

(19)

An information processing method including:

acquiring an evaluation result for a first user obtained by evaluating an action history of the first user in a first virtual space; and controlling, by a processor, provision, to the first user, of a service according to the evaluation result for the first user, in a second virtual space different from the first virtual space.

(20)

A program for causing a computer to function as an information processing apparatus including:

an acquisition unit that acquires an evaluation result for a first user obtained by evaluating an action history of the first user in a first virtual space; and a service control unit that controls provision, to the first user, of a service according to the evaluation result for the first user, in a second virtual space different from the first virtual space.

REFERENCE SIGNS LIST

1 Information processing system
10 Terminal apparatus

110 Operation unit
130 Control unit
140 Storage unit
160 Communication unit
180 Presentation unit
20 Virtual space construction server
210 Acquisition unit
220 Service control unit
230 Service providing unit
30 Parameter management server
310 Action history fraud identifying unit
320 Recording unit
330 Rating fraud identifying unit
40 Rating server
410 Rating unit

The invention claimed is:

1. An information processing apparatus comprising:
   circuitry configured to
      acquire an evaluation result for a first user obtained by evaluating an action history of the first user in a first virtual space; and
      control provision, to the first user, of a service according to the evaluation result for the first user, in a second virtual space different from the first virtual space.

2. The information processing apparatus according to claim 1, wherein
   the circuitry controls the provision of the service by increasing a restriction imposed on an action of the first user in the second virtual space as the evaluation result for the first user is lower.

3. The information processing apparatus according to claim 2, wherein
   the circuitry increases the restriction imposed on the action of the first user by reducing resources allocated to the action of the first user in the second virtual space.

4. The information processing apparatus according to claim 2, wherein
   the circuitry increases the restriction imposed on the action of the first user by decreasing a range in which the first user is allowed to act in the second virtual space.

5. The information processing apparatus according to claim 1, wherein
   the circuitry restricts or stops the provision of the service to the first user on a basis of a fact that the circuitry has been controlled not to execute the provision, to the first user, of the service according to the evaluation result for the first user.

6. The information processing apparatus according to claim 1, wherein
   the action history of the first user includes creation of a virtual object by the first user, and is evaluated on a basis of evaluation for the creation of the virtual object from one or a plurality of users different from the first user.

7. The information processing apparatus according to claim 6, wherein
   the action history of the first user is evaluated higher as the evaluation from the one or the plurality of users different from the first user is higher.

8. The information processing apparatus according to claim 1, wherein
   the action history of the first user includes statement information on the first user, and is evaluated on a basis of a frequency of a first word included in the statement information on the first user.

9. The information processing apparatus according to claim 8, wherein the action history of the first user is evaluated higher as the frequency of the first word included in the statement information on the first user is lower.

10. The information processing apparatus according to claim 9, wherein a word included in statements made for a certain user by other users are extracted as the first word on a basis of a fact that the statements have been detected in an amount exceeding a predetermined amount per unit time.

11. The information processing apparatus according to claim 1, wherein the action history of the first user includes information regarding handling of a controller by the first user, and the action history of the first user is evaluated on a basis of the information regarding the handling of the controller by the first user.

12. The information processing apparatus according to claim 1, wherein whether or not to provide the service according to the evaluation result for the first user to the first user in the second virtual space is controlled on a basis of a determination result obtained by determining whether or not there is fraud in at least any one of the action history of the first user in the first virtual space or the evaluation result for the first user obtained by evaluating the action history of the first user.

13. The information processing apparatus according to claim 12, wherein whether or not there is fraud in the evaluation result for the first user is determined.

14. The information processing apparatus according to claim 13, wherein whether or not there is fraud in the evaluation result for the first user is determined on a basis of a difference between the evaluation result for the first user and the evaluation result for a second user whose action history has similarity to the action history of the first user higher than first similarity, or a difference between the action history of the first user and the action history of a third user whose evaluation result has similarity to the evaluation result for the first user higher than second similarity.

15. The information processing apparatus according to claim 14, wherein whether or not there is fraud in the evaluation result for the first user is determined on a basis of whether or not the difference between the evaluation result for the first user and the evaluation result for the second user or the difference between the action history of the first user and the action history of the third user is larger than a threshold value.

16. The determination apparatus according to claim 12, wherein whether or not there is fraud in the action history of the first user is determined.

17. The information processing apparatus according to claim 16, wherein whether or not there is fraud in the action history of the first user is determined on a basis of an index of unnaturalness of the action history newly added for the first user with respect to the action history of the first user until then.

18. The information processing apparatus according to claim 17, wherein whether or not there is fraud in the action history of the first user is determined on a basis of whether or not the index of unnaturalness is larger than a threshold value.

19. An information processing method comprising:

acquiring an evaluation result for a first user obtained by evaluating an action history of the first user in a first virtual space; and controlling, by a processor, provision, to the first user, of a service according to the evaluation result for the first user, in a second virtual space different from the first virtual space.

20. A non-transitory computer-readable medium having embodied thereon a program, which when executed by a computer causes the computer to execute an information processing method, the method comprising acquiring an evaluation result for a first user obtained by evaluating an action history of the first user in a first virtual space; and controlling provision, to the first user, of a service according to the evaluation result for the first user, in a second virtual space different from the first virtual space.

* * * * *